United States Patent
Vidal Drummond et al.

(10) Patent No.: US 10,224,628 B2
(45) Date of Patent: Mar. 5, 2019

(54) PHOTONIC BEAMFORMING SYSTEM FOR A PHASED ARRAY ANTENNA RECEIVER

(71) Applicant: INSTITUTO DE TELECOMUNICAÇÕES, Lisbon (PT)

(72) Inventors: Miguel Vidal Drummond, Estarreja (PT); Rogério Nunes Nogueira, Gafanha Da Boa-hora (PT); Vanessa Cunha Duarte, Aveiro (PT)

(73) Assignee: INSTITUTO DE TELECOMUNICAÇÕES, Lisbon (PT)

( * ) Notice: Subject to any disclaimer, the term of this patent is extended or adjusted under 35 U.S.C. 154(b) by 0 days.

(21) Appl. No.: 15/520,424

(22) PCT Filed: Apr. 18, 2016

(86) PCT No.: PCT/IB2016/052206
§ 371 (c)(1),
(2) Date: Apr. 20, 2017

(87) PCT Pub. No.: WO2016/170466
PCT Pub. Date: Oct. 27, 2016

(65) Prior Publication Data
US 2017/0310006 A1    Oct. 26, 2017

(30) Foreign Application Priority Data
Apr. 20, 2015 (PT) .......................................... 108385

(51) Int. Cl.
*H01Q 3/26* (2006.01)
*H01Q 3/22* (2006.01)
(Continued)

(52) U.S. Cl.
CPC ............. *H01Q 3/2676* (2013.01); *H01Q 3/22* (2013.01); *H04B 10/2575* (2013.01); *H04B 10/64* (2013.01); *H04B 2210/006* (2013.01)

(58) Field of Classification Search
CPC ...... H01Q 3/2676; H01Q 3/22; H01Q 3/2682; H04B 10/64; H04B 10/2575; H04B 2210/006; G01S 7/032; G02B 6/12004
See application file for complete search history.

(56) References Cited

U.S. PATENT DOCUMENTS

| 4,725,844 A | * | 2/1988 | Goodwin et al. .... H01Q 3/2676 |
| 4,739,334 A | * | 4/1988 | Soref .................... H01Q 3/2676 |

(Continued)

FOREIGN PATENT DOCUMENTS

| EP | 2592768 | 5/2013 |
| WO | 2012/005618 | 1/2012 |

OTHER PUBLICATIONS

Miguel V. Drummond, Paulo P. Monteiro, and Rogerio N. Nogueira,; Photonic true time jdelay beamforming based on Polarization-Domain Interferometers,Journal of Light\vave Techi'ology, vol. 28, :\10. 17, Sep. 1, 2010.

*Primary Examiner* — Bernarr E Gregory
(74) *Attorney, Agent, or Firm* — Mark M. Friedman

(57) ABSTRACT

It is an object of the present invention a photonic system to perform beamforming of a radio signal received by a phased array antenna with N antenna elements. It provides true-time delay beamforming enabled by tunable optical delay lines (6) with a periodic frequency response. The present invention provides four key advantages: photonic RF phase shifting; highly-sensitive coherent detection with intrinsic photonic frequency downconversion; phase noise cancellation, since a frequency-shifted optical local oscillator can be derived from a same laser source (1) used to feed electro-optic modulators (5); and the possibility of only requiring a (Continued)

single delay line, shared amongst all tunable optical delay lines. Such set of advantages makes the proposed system extremely attractive for high-end wireless receivers, required for demanding applications such as satellite communication systems and broadband wireless signal transmission.

16 Claims, 7 Drawing Sheets

(51) Int. Cl.
    *H04B 10/2575*     (2013.01)
    *H04B 10/64*     (2013.01)
    *H01Q 3/00*     (2006.01)

(56) References Cited

U.S. PATENT DOCUMENTS

| | | | | |
|---|---|---|---|---|
| 4,885,589 A | * | 12/1989 | Edward et al. | H01Q 3/2676 |
| 4,929,956 A | * | 5/1990 | Lee et al. | H01Q 3/2676 |
| 5,311,196 A | * | 5/1994 | Hanson et al. | H01Q 3/2676 |
| 5,365,239 A | * | 11/1994 | Stilwell, Jr. | H01Q 3/2676 |
| H1625 H | * | 1/1997 | Frankel | H01Q 3/22 |
| 5,751,242 A | * | 5/1998 | Goutzoulis et al. | G01S 7/032 |
| 6,337,660 B1 | * | 1/2002 | Esman et al. | H01Q 3/2676 |
| 6,426,721 B1 | * | 7/2002 | Obara | H01Q 3/2676 |
| 9,257,745 B2 | * | 2/2016 | Vidal Drummond et al. | H01Q 3/2676 |
| 2002/0181874 A1 | * | 12/2002 | Tulchinsky et al. | H01Q 3/2676 |
| 2004/0090365 A1 | * | 5/2004 | Newberg et al. | H01Q 3/2676 |
| 2005/0088339 A1 | * | 4/2005 | Yap | H01Q 3/2676 |
| 2006/0067709 A1 | * | 3/2006 | Newberg et al. | H01Q 3/2676 |
| 2008/0044128 A1 | * | 2/2008 | Kish, Jr. et al. | G02B 6/12004 |
| 2013/0169483 A1 | * | 7/2013 | Vidal Drummond et al. | H01Q 3/2682 |
| 2013/0202306 A1 | * | 8/2013 | Middleton et al. | H01Q 3/2676 |
| 2013/0202307 A1 | * | 8/2013 | Middleton et al. | H01Q 3/2676 |
| 2013/0202308 A1 | * | 8/2013 | Middleton et al. | H01Q 3/2676 |

\* cited by examiner

PHOTONIC BEAMFORMING SYSTEM FOR A PHASED ARRAY ANTENNA RECEIVER

FIELD OF THE INVENTION

It is an object of the present invention a photonic system to perform beamforming of the radio signal received by a phased array antenna with N antenna elements.

The photonic system of the present invention performs beamforming of the radio signal received by a phased array antenna. The system provides true-time delay beamforming enabled by tunable optical delay lines with a periodic frequency response. In one of the possible embodiments, a Mach-Zehnder delay interferometer is able provide such operation.

Such interferometer has a preset differential time delay between its arms/branches, and also an adjustable coupling ratio between the powers applied to its arms. The time delay can be configured by adjusting such coupling ratio. In the first stage of the proposed system the RF signals output by all antenna elements of the phased array antenna are converted to the optical domain using an array of electro-optic modulators. The amplitude of the modulated optical signals can be adjusted using variable optical attenuators and/or optical amplifiers; the phase of the modulated optical signals can be adjusted using phase shifters; and their time delays are defined using the proposed tunable optical delay lines. The adjusted signals are then combined into a single signal, which is then coherently detected using a frequency-shifted optical local oscillator derived from the same laser source used to feed the electro-optic modulators. Due to the linearity of the functions performed by the system, different functions can be performed either in the optical domain or in the electrical domain. Furthermore, some functions can also have a simplified implementation. This is explored in different embodiments.

The present invention provides four key advantages: photonic RF phase shifting; highly-sensitive coherent detection with intrinsic photonic frequency downconversion; phase noise cancellation, since the frequency-shifted optical local oscillator can be derived from the same laser source used to feed the electro-optic modulators; and possibility of only requiring a single delay line, shared amongst all tunable optical delay lines. Such set of advantages makes the proposed system extremely attractive for high-end wireless receivers, required for demanding applications such as satellite communication systems and broadband wireless signal transmission.

PRIOR ART

A phased array antenna comprises multiple antenna elements, usually arranged in a two dimensional configuration such as a square. In order to transmit a signal in a given direction, the phases and amplitudes of the radio frequency (RF) signals fed to each antenna element are adjusted such that the radiation diagram of the phased array antenna is maximized at the target direction. An individual adjustment of the phase and amplitude of the signal fed to each antenna element allows to fully customize the radiation diagram of the phased array antenna, enabling more sophisticated applications such as multi-beam operation, in which the radiation diagram is maximized for more than one direction. Since a phased array antenna is bidirectional, the operation principles described above also apply for receiving a radio signal. The main advantages of using a phased array antenna in comparison with using a single antenna, usually much more sophisticated than an antenna element of the phased array antenna, are that physical displacement or rotation of the antenna is not required to steer the radiation diagram, and also the unique flexibility offered by a phased array antenna to shape its radiation diagram.

In order to shape the radiation diagram of a phased array antenna with N antenna elements a beamforming system is required to process the N RF signals output by the antenna elements. Such system should receive N input signals, individually control their amplitudes and phases, and combining the resulting signals into a single output. In order to perform phase control of a signal, the typical solution is using a phase shifter which provides a constant phase shift for a wide range of frequencies. However, the phase shift applied to a given signal is only correct for a single frequency. This means that a phased array antenna with a beamforming system comprising phase shifters only provides correct operation for a single frequency, which is typically the carrier frequency of the input radio signal. For any other frequency, the phase shifts are incorrect, meaning that the radiation diagram is only exactly as expected for the operational frequency. This problem is commonly denominated beam squinting. While this is not a problem for quasi single-frequency signals, this is a serious limitation to spectrally rich signals such as RADAR signals, wireless signals carrying high bit rate data and radio astronomy signals.

Beam squinting can be avoided by using phase shifters in which the phase shift varies proportionally to the frequency. Such property is enabled by using time delays instead of frequency-constant phase shifters, thereby providing true-time delay beamforming. An ideal true-time delay beamforming system provides an identical radiation diagram independently of the operational frequency, thereby being the ideal solution. However, implementation of tunable electrical delay lines is challenging, particularly for high RF frequencies, e.g., 30 GHz. At such high frequencies the attenuation and frequency dependent response of such devices are considerable. Such devices are also bulky and typically have long tuning times.

These typical limitations of electronic technologies can be overcome by photonic technology, in particular by microwave photonic techniques. Microwave photonics is an interdisciplinary area that addresses the processing of RF signals in the optical domain using photonic technology. Photonic technology offers waveguides with broad bandwidth (on the order of THz) and very low losses, light weight, low power consumption, and, very important to space-related applications, immunity to electromagnetic interference. The operational bandwidth of a photonic system is usually limited by the bandwidth of the electrical-to-optical and optical-to-electrical converters, which nonetheless can nowadays go easily beyond 30 GHz. In a photonic beamforming system the signals received by a phased array antenna are first converted to the optical domain by modulating one or multiple input laser signals. Each modulated optical signal is then delayed by a tunable optical delay line (TODL), and has its amplitude adjusted by a variable optical attenuator and/or by an optical amplifier. The resulting optical signals are then combined into a single optical signal, which is then converted to the electrical domain using a photo-receiver. Some of the functions performed by the photonic beamforming system, in particular time delaying, amplitude adjustment and signal combination can also be done, at least in part, in the electrical domain.

Many different photonic beamforming systems have been proposed. The prior art below describes relevant techniques to the one disclosed in the present invention.

U.S. Pat. No. 5,428,218 discloses a TODL based on spatial multiplexing. In such free-space implementation, the optical signal is directed into a given optical fiber through the adjustment of a mirror. As different optical fibers have different lengths, one can get a discrete tuning of the time delay added to the optical signal. This implementation also includes the possibility of having a multi-beam system, i.e., the system can be simultaneously used by more than one optical signal. A multi-beam implementation of the TODL employing several adjustable mirrors is proposed as a true-time delay beamforming system for a phased array antenna receiver.

U.S. Pat. No. 5,461,687 discloses a TODL based on reflective dispersive media. By tuning the wavelength of the input optical signal the path length of the propagating signal changes, resulting in a tunable time delay. In a first embodiment, the dispersive medium is implemented in a free space apparatus using a diffraction grating and tilted mirrors. In a second embodiment, fiber Bragg gratings with different center wavelengths are located at different points of an optical fiber. A true-time delay photonic beamforming system is proposed using the disclosed TODL.

U.S. Pat. No. 7,558,450 B2 discloses a TODL composed by resonant elements coupled to a waveguide. The resonant elements are based on ring resonators. This implementation is limited to optical signals comprising an optical carrier and a single sideband. In one embodiment, the symmetric shift of the frequency response of two resonant elements enables the adjustment of the time delay induced to the sideband, which carries the RF signal. A third resonant element adjusts the phase of the optical carrier in order to define the phase of the output RF signal. Of greater importance than the tuning method is the suitability of the proposed TODL to RF signals without any spectral content between the optical carrier and the sidebands. Consequently, the TODL's frequency response is irrelevant at frequencies located between the sidebands and the optical carrier. Further embodiments are proposed using more resonant elements for increased functionality. A true-time delay photonic beamforming system is proposed using the disclosed TODL.

Patent No. WO2012005618 A1 discloses a true-time delay photonic beamforming system for a phased array antenna transmitter. The system is based on a TODL, which in turn is based on a Mach-Zehnder delay interferometer (MZDI) with tunable coupling ratio (MZDI-TCR). Such interferometer comprises an input optical splitter, two delay lines, and an output optical coupler. The two delay lines have a differential time delay between them. The input optical splitter and/or the output optical coupler has a tunable coupling ratio, meaning that the power ratio between both arms of the interferometer can be adjusted. The time delay set by such TODL can be adjusted by changing the tunable coupling ratio. The periodic frequency response of such TODL requires that the optical carrier and sidebands of the optical signal must be centered at maxima of the MZDI's amplitude response. This implies that the differential time delay between the delay lines of the interferometer, which defines the period of its frequency response, must be defined depending on the frequency of the RF signal. In a first embodiment, the RF signal to be radiated by the phased array antenna is first converted to the optical domain. The modulated optical signal is then split into N copies, and each copy is delayed by the MZDI-TCR based TODL. The delayed optical signals are then converted to the electrical domain, and the resulting signals are fed to the respective antenna elements. In a second embodiment, FIG. 3, all the MZDI-TCRs share the same input optical coupler and delay lines. Only two delay lines are used, consisting of the two polarization axes of a birefringent medium. A second embodiment discloses the use of wavelength-division multiplexed laser signals, one per antenna element. In another embodiment, suitable only for single sideband optical signals, the output couplers of the MZDI-TCRs are implemented partly on the optical domain and partly on the electrical domain. The tunable coupling ratio is adjusted in the optical domain by variable optical attenuators, whereas the addition of the orthogonally polarized signals is performed by simultaneously photodetecting them using a single photoreceiver. The first embodiment is investigated in detail in the scientific article Drummond, Miguel V., Paulo P. Monteiro, and Rogério N. Nogueira. "Photonic true-time delay beamforming based on polarization-domain interferometers." Lightwave Technology, Journal of 28.17 (2010): 2492-2498, DOI: 10.1109/JLT.2010.2057408.

A simple adaptation of the photonic beamforming system proposed in PCT/PT2010/000061 for a phased array antenna receiver would be to replace the optical-to-electrical converters by electrical-to-optical converters and vice-versa. Such approach is presented in FIG. 1. A phased array antenna with N antenna elements (4) is considered. A single laser source (1) provides a laser signal, which is split into N copies by an optical splitter (2). Each copy is modulated by the amplified RF signal of the corresponding antenna element. Electrical amplifiers (3) are used for amplification, and electro-optical modulators (5) are used for electro-optic modulation. Each modulated optical signal is then processed by the TODL (6) which comprises an input optical coupler with tunable splitting ratio, a differential time delay between arms of $\tau$, and an output optical coupler. The delayed optical signals are then combined into a single signal by an optical combiner (7). The resulting signal is converted to the electrical domain using a photoreceiver (8). This scheme, although simple, presents some disadvantages.

Considering said technical solution considered as closest, it has three disadvantages. First, it does not include coherent detection, which would greatly improve the sensitivity of the system. Second, it does not include photonic frequency downconversion, meaning that the output electrical signal would still have a high carrier frequency, thereby requiring high-frequency electronic devices. Third, due to the periodic response of the TODLs such system is suitable only for a discrete set of RF frequencies, as the periodic frequency response of the TODL requires that the optical carrier and sidebands of the optical signal must be centered at maxima of the MZDI's amplitude response. Such disadvantages are addressed by the present invention.

SUMMARY OF THE INVENTION

The present invention therefore discloses a photonic system to perform true-time delay beamforming of the radio signal received by a phased array antenna.

It is an object of the present invention a photonic beamforming system for a phased array antenna with N antenna elements (4) which, in a first embodiment, comprises:
 means for generating a first and a second optical carrier, wherein the first and second optical carriers have different frequencies;
 means for optically processing N signals from N antenna elements, which comprise:
  an array of N electro-optic modulators (5), each having as input a copy of the first optical carrier and being driven by the RF signal generated by one of the N antenna elements;

an array of N tunable optical delay lines (TODL) (6), each having as input the output signal of one of the N electro-optic modulators (5), wherein each TODL (6) has a periodic frequency response;

an array of optical combiners (7) having as input the output signals of the array of N TODL, and producing at least one output signal;

means for converting at least one output signal from said means for optically processing the N signals from the N antenna elements (4) to an electrical output signal, which comprise:

an array of coherent receivers (14), each having as a first input one of the output signals of the array of optical combiners (7), and, as a second input a copy of the second optical carrier, which serves as an optical local oscillator (OLO);

an array of electrical combiners (15) having as input the output signals of the array of coherent receivers (14), and producing at least one output signal which is the electrical output signal of the photonic beamforming system.

It is also an object of the present invention a method for beamforming the radio signal received by a phased array antenna with N antenna elements, implemented by the previously described system, in any of its embodiments, which comprises the following steps:

generation of a first and a second optical carriers;

inputting N copies of the first optical carrier in means for optically processing N signals from N antenna elements, specifically in each electro-optic modulator (5) of an array of electro-optic modulators comprised by said means;

modulation of each copy of the first optical carrier with an RF signal generated by one of the N antenna elements;

processing of each resulting signal in one of N TODL;

optical combination of the processed signals into at least one output optical signal;

converting said at least one output optical signal to an electrical output signal, which comprises:

heterodyne coherent detection of each resulting signal in an array of coherent receivers (14), using a copy of the second optical carrier as OLO;

combination of the resulting signals into at least one electrical output signal, one of which is the electrical output signal of the photonic beamforming system.

True-time delay beamforming is enabled by the use of TODLs with a periodic frequency response. Such a TODL (6) is essentially a tunable optical filter with a finite or a (quasi-) infinite impulse response. In two specific embodiments of the present invention, each TODL (6) with a periodic frequency response is:

a Mach-Zehnder delay interferometer with tunable coupling ratio (MZDI-TCR)

Or a ring resonator with a tunable coupling ratio.

The MZDI-TCR is an example of a finite impulse response optical filter, whereas a ring resonator with tunable coupling ratio between the waveguide and the ring itself serves as an example of a quasi-infinite impulse response optical filter. Without loss of generality, the description is based on the MZDI-TCR. An MZDI-TCR has a preset differential time delay between its arms, here defined with a value of $\tau$, and also an adjustable ratio between the average power of one arm relatively to the other. The time delay can be configured by adjusting such coupling ratio. Such TODL (6) is disclosed in patent application WO2012005618 A1, and employed in a true-time delay photonic beamforming system for a phased array antenna transmitter.

All the previously referred three disadvantages are overcome by the present set of innovations thanks to the use of coherent detection. Firstly, in order to have coherent detection an OLO must be used. The output optical signal of the beamforming system should be combined with the OLO before photodetection. Coherent detection not only enables a higher sensitivity than direct detection, but it also allows using modulation schemes other than intensity modulation, such as amplitude modulation, phase modulation or amplitude and phase modulation.

In an embodiment of the present invention, amplitude modulation can be used to produce optical signals with suppressed optical carrier (OC). This is particularly advantageous when Mach-Zehnder modulators are used as electro-optic modulators, as such modulators offer maximum linearity when biased at the minimum transmission point, which is the case when optical signals with suppressed OC are modulated. Another reason why using optical signals with suppressed OC is important is that it also allows optimum use of optical amplifiers, as the gain provided by these goes directly to the sidebands of the modulated optical signal, which is where all information is contained. For optical signals with unsuppressed OC, the gain would have to be shared with the OC, which does not bring any advantage since no information is carried by the OC. This would be particularly disadvantageous for low modulation indexes, since the power of the OC would be considerably higher than the power of the sidebands.

On the other hand, if optical amplification is not required phase modulation can be employed instead, which brings the advantage of requiring simple phase modulators. It can be shown that phase modulation shows the same linearity behavior as amplitude modulation with suppressed OC. Using phase modulators also avoids needing phase shifters for controlling the optical phase of each path, as such function can also be performed by the phase modulators by adding slowly-varying DC offsets to the RF signals fed to the modulators. Coherent detection also brings the important advantage of avoiding any loss of information when converting the input optical signal to the electrical domain. Such advantage can be used for further processing the detected electrical signals, either using analog devices such as power combiners, or using a digital signal processor. Digital signal processing can be used to enhance the linearity of the system, or, more importantly, to perform digital beamforming in which the outputs from different photonic beamforming systems can be combined into a single output.

Secondly, there are many ways of performing photonic frequency downconversion. One possibility would be using a multi-tone laser signal such that at photodetection the beating of such tones with the sidebands would yield a frequency downconverted RF signal. This would, however, increase the spectral content of the signal, which is undesirable given the limited operational bandwidth of the MZDI-TCR-based TODLs. A simpler way which takes full advantage of coherent detection is using a frequency-shifted OLO, as illustrated in FIG. 2, and which is embodied in the object of the present invention. Instead of centering the OLO at the same frequency of the OC, i.e., setting $f_{OLO}=f_{OC}$, thereby detecting both sidebands located at $f_{OC}\pm f_{RF}$, and producing an electrical signal at a frequency of $f_{RF}$, the OLO is centered closer to one sideband, which in the figure is the one with highest frequency as $f_{OLO}=f_{OC}+f_{IF}$. The detected signal thus has two components corresponding to the sidebands of the input optical signal. One sideband is located at a downconverted frequency of $f_{RF}-f_{IF}$, whereas the other is located at an upconverted frequency of $f_{RF}+f_{IF}$. The frequency downconverted signal can be filtered using a band-pass filter, which is theoretically equivalent to performing single sideband (SSB) filtering of the sideband with the lowest frequency. For heterodyne detection, as in the case of the present invention, the minimum downconverted frequency is limited by the spectral width of the sidebands and by the frequency jitter.

There are essentially three options for implementing the frequency-shifted OLO, which provide three possible embodiments of the present invention.

The first one is to use a free-running laser source (1), independent of the input laser source (1) which feeds the photonic beamforming system. In order to have the OLO frequency- and phase-locked to the input laser signal a control loop is required, such as an analog optical phase-locked loop, or a digital carrier frequency and phase recovery implemented in a digital signal processor processing the down-converted electrical signal. Both control loops are, however, complex to implement.

The second option is to use a multi-tone laser source (1) which generates at least two tones with a given frequency spacing. Two of the tones are separated by an optical interleaver, and one tone feeds the photonic beamforming system whereas the other tone is used as OLO. This option has the disadvantage that the laser output power is split between the at least two tones, and that a wavelength-dependent optical interleaver is required to separate one tone from the other.

A third option is to derive the OLO from the input laser signal. In this case, said second optical carrier is generated from said first optical carrier. A possible implementation would be to modulate a copy of the signal laser source (1) such that the modulated optical signal would contain a single tone at a frequency $f_{OLO}$. Yet another possible implementation would be to modulate a copy of the input laser signal such that the modulated optical signal would have a tone at $f_{OLO}$. Such modulated optical signal would then injection lock a second laser source (1) tuned to a frequency of $f_{OLO}$, thereby producing an optical signal with a single tone with a frequency of $f_{OLO}$.

All implementations produce an OLO signal which is frequency- and phase-locked to the input laser signal, and also frequency-shifted from $f_{OLO}$ to $f_{OLO}$. A very important advantage of having the input laser signal, and consequently the output optical signal of the beamforming system, phase-locked with the frequency-shifted OLO is that there is phase noise cancellation, thereby greatly relaxing the linewidth requirements of the input laser source (1). Having the output electrical signal at a lower frequency brings the advantage of relaxing the remaining electrical circuitry, e.g., by potentially saving a high-frequency analog or digital frequency downconverter. Therefore, the output electrical signal can be immediately digitized by an analog-to-digital converter and further processed in a digital signal processor.

Thirdly, and also thanks to frequency-shifting the OLO as is implemented by the present invention, since only one of the sidebands of the optical signal is coherently detected, then there is the need of only delaying such sideband. Consequently, the TODLs need to process only one of the sidebands, i.e., the frequency response of the TODLs needs to be aligned only with the processed sideband. As a result, there is no longer the requirement that the differential time delay between the delay lines of each interferometer must be discretely defined depending on $f_{RF}$, i.e., the period of the frequency response of the TODL (6) no longer needs to be related with $f_{RF}$. Detecting only one of the sidebands of the optical signal also enables the possibility of having photonic RF phase shifting. By phase shifting the optical signal relatively to the frequency-shifted OLO by a given value, the phase of the resulting coherently detected frequency-downconverted electrical signal is shifted by the same value. Such would not be the case if both sidebands were detected.

Due to the linearity of the functions performed by the system, different functions can be performed in the optical domain, in the electrical domain or in both domains. For example, signal combination can be performed only in the optical domain using the array of optical combiners (7), only in the electrical domain using the array of electrical combiners (15), or in both domains using both arrays of combiners. Furthermore, some means of the system can be combined with each other such that the complete system is simplified. For example, and as explored in one of the embodiments, by embedding the array of optical combiners (7) in the array of N TODL (6) only a single optical delay line (17) is required.

Reference is made to the embodiment of FIG. 7, where all optical carriers—embodied by laser signals—which are used as OLOs in coherent detection are frequency-shifted by $f_{IF}$ (point B in FIG. 7). The embodiment of FIG. 7 may be such that the means for generating an optical carrier consist of two distinct means, each for generating a single optical carrier. Coherent detection now here results in two signals, centered at $\pm f_{RF}-f_{IF}$, instead of one single signal centered at $f_{RF}-f_{IF}$. Low-pass filtering leads to the suppression of the signal centered at $-f_{RF}-f_{IF}$. In practice, this means that single-sideband (SSB) filtering is performed during coherent detection. Besides the advantage that frequency downconversion is achieved simultaneously during coherent detection, thereby relaxing the bandwidth of the balanced receiver from $\sim f_{RF}$ down to $\sim f_{RF}-f_{IF}$, now RF phase shifting can also be achieved in the optical domain simply by changing the phase of the OLO and/or of the modulated optical signal.

In summary, this invention proposes a new application of the tunable optical delay line disclosed in the international patent application PCT/PT2010/000061 for a phased array antenna operating in receive mode, therefore also enabling true-time delay operation. It should be noted, however, that further innovations are introduced in the present invention, which enable photonic frequency downconversion of the RF signal, photonic RF phase shifting, and mitigation of several impairments bound with RF-to-optical signal conversion.

The differences between a preferred embodiment of the present invention and the international patent application PCT/PT2010/000061 can be summarized as follows. In said preferred embodiment of the present invention:

6. The photonic beamforming network operates in the receive mode, i.e., the phased array antenna receives a wireless signal instead of generating one;
7. The main novelty resides in using coherent detection for detecting the combined signals provided by all antenna elements, wherein the optical local oscillator originates from the same laser sources but it is subject to frequency shifting. This results in multiple advantages, as seen below;
8. The delay line can support any RF frequency, as it no longer needs to be limited to the free-spectral range of the MZDI;
9. A detailed implementation of the MZDI is provided, which is fully compatible with photonic integrated circuits. This is very relevant, as the implementation of such system is only possible in a photonic integrated circuit;

10. The description of a complete system in which signal combining from multiple antenna elements (4) is performed not only in the optical domain but also on the electrical domain is provided.

DESCRIPTION OF THE FIGURES

Exemplary embodiments of the invention are explained in greater detail below.

DETAILED DESCRIPTION OF THE INVENTION

Figure 1:
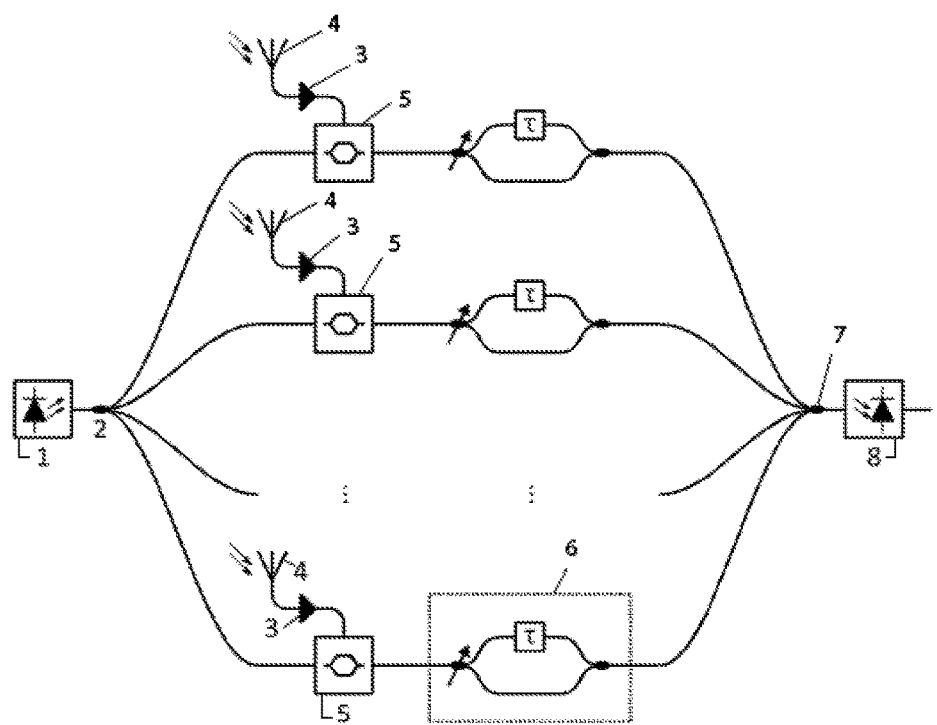
FIG. 1 shows the basic implementation of the photonic beamforming system for a phased array receiver using a single laser source (1), in which all modulated optical signals are individually delayed and then combined into a single optical signal.

The basic system architecture and operation principles of the present invention are defined in the Summary of the invention. Several configurations are detailed in the following lines.

In a seventh embodiment of the system of the present invention, the array of optical combiners (7) is embedded in the array of N TODL, in which:

each MZDI-TCR comprises an input optical coupler with tunable coupling ratio having a first and a second output;

the array of optical combiners (7) comprises three sets of optical combiners, such that:
  the first set of optical combiners (16) is arranged such that it combines the signals from the first output of the N input optical couplers with tunable coupling ratio;
  the second set of optical combiners (16) is arranged such that it combines the signals from second output of the N input optical couplers with tunable coupling ratio;
  at least one output of the first set of optical combiners (16) is connected to an optical delay line (17);
  the third set of optical combiners (18) is arranged such that it combines at least one output signal from the second set of optical combiners (16) with the output signals from the optical delay lines (17).

In this embodiment, the array of N TODLs is simplified such that all TODLs share the same optical delay line (17). The advantage is that only a single optical delay line (17) is required. However, such advantage has the cost of requiring two sets of optical combiners (16), which therefore may require up to twice the number of monitoring points (13) in comparison with the first embodiment. An increased flexibility is achieved if the optical delay line (17) is tunable.

In an eighth embodiment of the system of the present invention, as an alternative to the previously described configuration, the array of optical combiners (7), the array of coherent receivers (14) and the array of electrical combiners (15) are embedded in the array of N TODL, such that:

each MZDI-TCR comprises an input optical coupler with tunable coupling ratio having a first and a second outputs;

the array of optical combiners (7) comprises two sets of optical combiners, such that:
  the first set of optical combiners (16) is arranged such that it combines the signals from the first output of the N input optical couplers with tunable coupling ratio;
  the second set of optical combiners (16) is arranged such that it combines the signals from second output of the N input optical couplers with tunable coupling ratio;

the array of coherent receivers (14) comprises two sets of coherent receivers (14) such that:
  each coherent receiver (14) of the first set of coherent receivers (14) has as a first input one the output signals of the first set of optical combiners (16) and, as a second input a copy of the second optical carrier, which serves as an OLO;
  each coherent receiver (14) of the second set of coherent receivers (14) has as a first input one the output signals of the second set of optical combiners (16) and, as a second input a copy of the second optical carrier, which serves as an OLO;

the array of electrical combiners (15) comprises three sets of electrical combiners (15), such that:
  the first set of electrical combiners (15) is arranged such that it combines the signals from the first set of coherent receivers (14);
  the second set of electrical combiners (15) is arranged such that it combines the signals from the second set of coherent receivers (14);
  at least one output of the first set of electrical combiners (15) is connected to an electrical delay line (19);

the third set of electrical combiners (15) is arranged such that it combines at least one output signal from the second set of electrical combiners (15) with the output signals from the electrical delay lines (19).

This embodiment has similarities with said preceding embodiment, but here the system only has a single electrical delay line (19).

In a specific embodiment of the photonic beamforming system of the present invention, combinable with any of the preceding, it further comprises an optical splitter (2) connected to the means for generating first and second optical carriers, for generating N copies of the first optical carrier.

In a specific embodiment of the photonic beamforming system of the present invention, combinable with any of the preceding, the system further comprises an array of optical amplifiers (10), wherein each optical amplifier (10) is connected to the output of one of the N electro-optic modulators (5).

In yet another specific embodiment of the photonic beamforming system of the present invention, the system further comprises an array of phase shifters, wherein one phase shifter is connected to each output of the input optical couplers with tunable coupling ratio of each MZDI-TCR.

In yet another specific embodiment of the photonic beamforming system of the present invention, the system further comprises an array of phase shifters (11), wherein each phase shifter (11) is connected to the output of one of the N electro-optic modulators (5).

In a possible embodiment of the photonic beamforming system of the present invention, combinable with any of the preceding which comprises an MZDI-TCR, each MZDI-TCR has at least two outputs, wherein at least one output is a monitoring point (13).

In a possible embodiment of the photonic beamforming system of the present invention, at least one output of the array of optical combiners (7) and of the array of electrical combiners (15) is a monitoring point (13).

In a specific embodiment of the photonic beamforming system of the present invention, combinable with any of the preceding, the system further comprises a monitoring and control system, wherein such system reads information from the monitoring points (13) or from the electrical and optical outputs of the photonic beamforming system, processes the information in a digital signal processor, and actuates on the array of N electro-optic modulators (5), on the array of optical amplifiers (10), and on the array of phase shifters (11).

Having a photonic beamforming system based on coherent detection requires special care as the output signal depends on the relative phases of all delayed optical signals. Hence, the phase stability of all optical paths is preferably carefully monitored and controlled.

Passive stabilization can be achieved by using a compact implementation in which the effects of mechanical vibrations and thermal variations are minimized or are at least more homogeneous. Photonic circuit integration is therefore a key technology for the present application.

Active stabilization can be achieved using a typical feedback-based monitoring and control system. Information is read from monitoring outputs located at strategic points of the system. Such information is processed, and then control inputs such as phase shifters (11) or phase modulators are actuated based on such information. Active stabilization may or may not involve temporary operation disruption of at least part of the system. If the signals processed by the system also serve for monitoring purposes then there is no disruption of the system. The same applies if non-disturbing monitoring signals are added to the input signals, e.g., out-of-band pilot tones. However, if the input signals are replaced or dominated by monitoring signals, then operation disruption is unavoidable.

Embodiments

Figure 3:
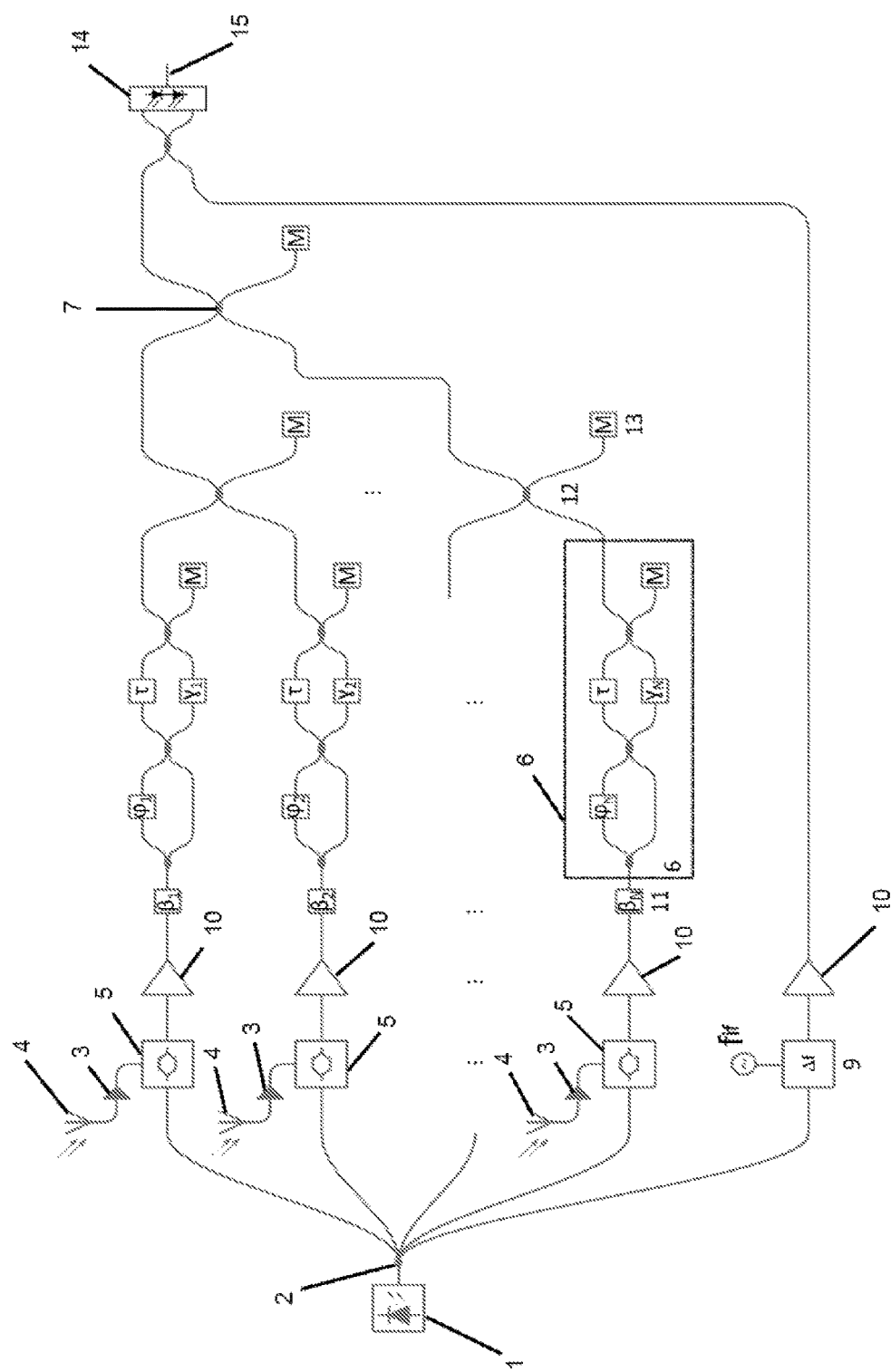
FIG. 3 shows a second embodiment of the proposed beamforming system for a phased array receiver in which signal combination is done in the optical domain, thereby requiring a single coherent receiver (14). The optical local oscillator is obtained by frequency-shifting a copy of the input laser signal.

A second embodiment is shown in FIG. 3. This embodiment incorporates all the advantageous features described in the previous section. Besides the N upper paths required to process the input signals from all the N antenna elements, there is another path at the bottom used to generate the frequency-shifted OLO signal. A copy of the input laser signal is frequency-shifted by a frequency shifter (9) from a frequency of $f_{OC}$ to a frequency of $f_{OLO}=f_{OC}+f_{IF}$.

After electro-optic modulation, for the input RF signals, and frequency-shifting, for the OLO, the resulting signals are amplified by an array of optical amplifiers (10). Each modulated optical signal is then phase-shifted by a phase shifter $\beta_i$ (11), i=1, ..., N. The array of phase shifters (11) is useful not only for individual RF photonic phase shifting, but also for active phase stabilization of each path. The use of phase shifters (11) can be avoided if electro-optic phase modulation is used, as phase shifting can be performed simultaneously with phase modulation.

The phased shifted optical signals are then processed by an array of N TODLs. A preferred implementation of the TODL (6) is here depicted. It comprises an input Mach-Zehnder interferometer with two outputs serving as an input optical coupler with tunable coupling ratio, in which the coupling ratio is controlled by the phase shifter $\phi_i$, i=1, ..., N. The upper output is connected to an optical delay line with a delay of $\tau$, whereas the lower output connects to a phase shifter $\gamma_i$, i=1, ..., N. The purpose of such phase shifter is to align the frequency response of the TODL (6) with the center frequency of the processed sideband of the TODL's input optical signal. The output signals from the optical delay line and phase shifter are then combined by a 2-by-2 optical coupler. The optical signal of the upper output is the TODL's output optical signal, whereas the optical signal of the lower output can be used for monitoring purposes, in particular for controlling the phase shifters $\phi_i$ and $\gamma_i$.

The delayed optical signals are then combined by an optical combiner, here depicted as an arrangement of multiple 2-by-2 optical couplers (12). Such arrangement has up to N outputs, in which one output (upper output in FIG. 3) produces the combined optical signal, and the remaining outputs can be used for monitoring purposes (13).

These monitoring points (13) can be useful for controlling the phase shifters (11) $\beta_i$, i.e., for defining and stabilizing the relative phases of all delayed optical signals. The combined optical signal is combined with the frequency-shifted OLO and then coherently detected by a coherent receiver (14).

The embodiment depicted in FIG. 3 is a particular case of the first embodiment, as signals are only combined in the optical domain. This means that the array of optical combiners (7) referred in the first embodiment is implemented in FIG. 3 as an arrangement of multiple 2-by-2 optical couplers (12), whereas the array of electrical combiners (15) can be simply considered as a 1-by-1 electrical combiner, which is connected to the output of the coherent receiver (14).

Even though FIG. 3 depicts the preferred implementation of a heterodyne coherent receiver (14) comprising a balanced photodetector, homodyne receiving and/or single-ended detection are also valid options. The frequency down-converted output electrical signal can be recovered using a bandpass filter centered at the frequency of $f_{RF}-f_{IF}$. The filtered signal can be demodulated, subject to further analog or digital signal processing, or used for monitoring purposes.

Figure 4:
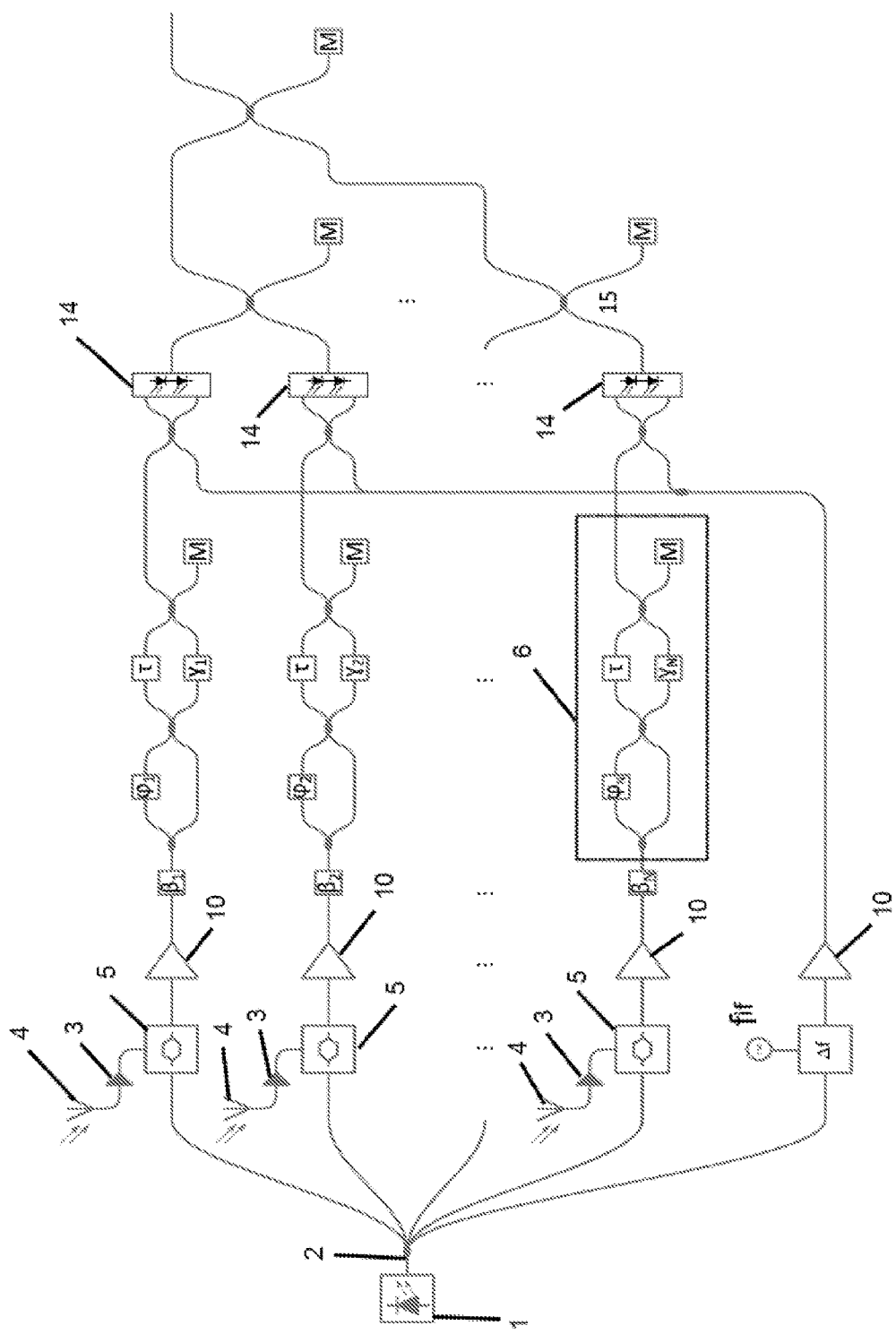
FIG. 4 shows a third embodiment of the proposed beamforming system. Signal combination is done only in the electrical domain, thereby requiring N coherent receivers (14).

A third embodiment is shown in FIG. 4. This embodiment illustrates how some functions originally performed in the optical domain can be performed in the electrical domain, therefore comprising an array of electrical combiners (15) with N inputs.

In this case, the combination of the delayed optical signals is done in the electrical domain. The electrical combiner (15) therefore has N inputs. Each delayed optical signal is first coherently detected.

The frequency-shifted OLO signal is split into N copies, in which each copy feeds one coherent receiver (14). The N output electrical signals are then combined into a single signal using an electrical combiner (15), implemented as an arrangement of multiple 2-by-2 electrical couplers (15).

The embodiment depicted in FIG. 4 is also a particular case of the first embodiment, as signals are only combined in the electrical domain. This means that the array of optical combiners (7) referred in the first embodiment is implemented in FIG. 4 simply as N 1-by-1 optical couplers (12), each connecting the output of one TODL (6) to one input of one coherent receiver (14). The array of electrical combiners (15) is implemented in as an arrangement of multiple 2-by-2 electrical couplers (15).

Likewise the optical combiner (7) depicted in the first embodiment, the monitoring points (13) can be useful for controlling the phase shifters (11). The main advantage of having signal combination done in the electrical domain is that an implementation of the photonic functionalities in a photonic integrated circuit requires less chip area. In addition, the insertion loss of the electrical combiner (15) can be lower than optical combiner (7), particularly because the electrical signals to be combined are already frequency downconverted.

Figure 5:
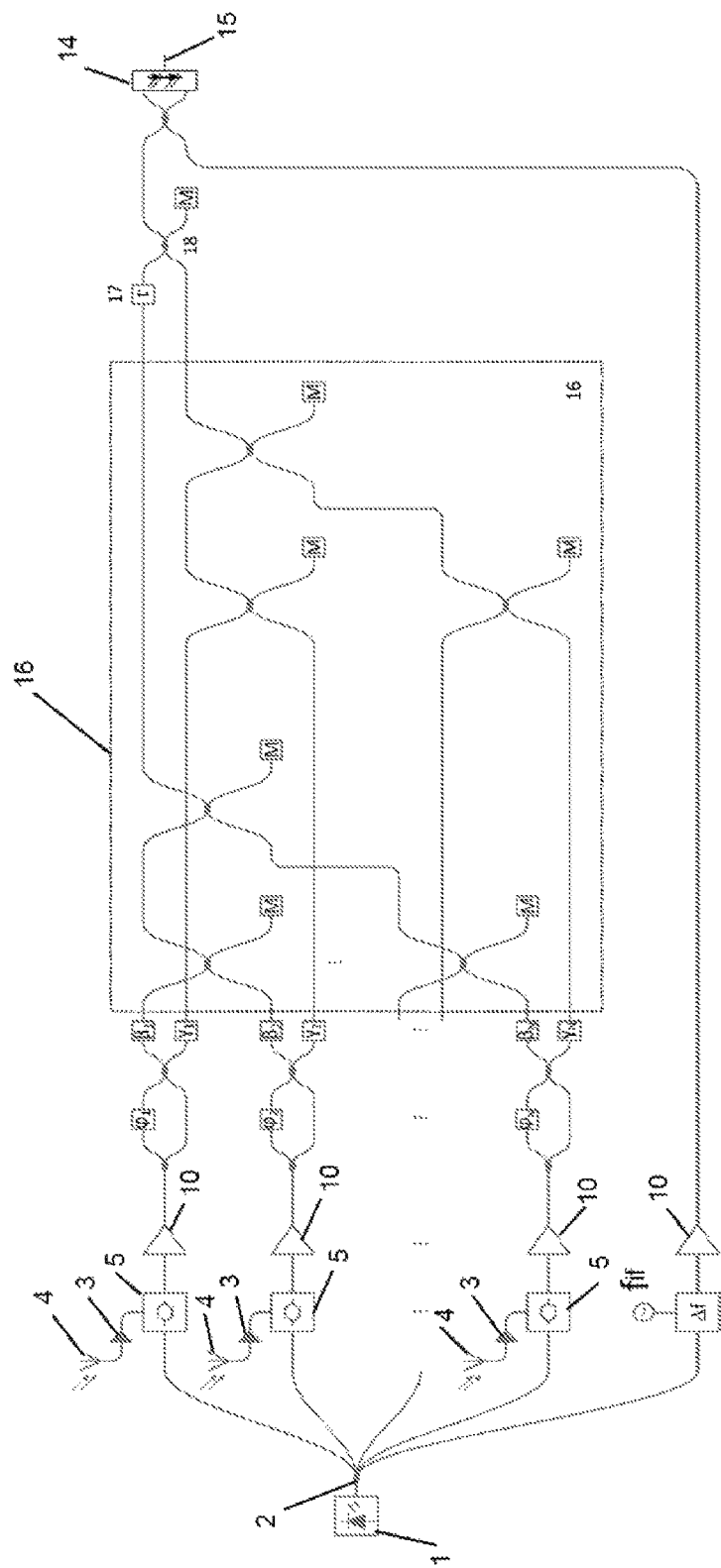
FIG. 5 shows a fourth embodiment of the proposed beamforming system using a single optical delay line (17). In order to achieve so, the signals from the upper output of the input optical coupler with tunable coupling ratio of all MZDIs are combined into a single optical signal, which is fed to the optical delay line (17). The signals from the lower output of the input optical coupler with tunable coupling ratio of all MZDIs are likewise combined into a single optical signal, which is fed to the output optical coupler (18).

Another possible embodiment is shown in FIG. 5, in which the array of N TODLs is simplified such that all TODLs share the same optical delay line (17). The present embodiment implements a simplified system, in which a single optical delay line (17) is shared by the N TODL.

In this case, the array of TODLs operates as follows. Each TODL (6) still comprises an input Mach-Zehnder interferometer with two outputs serving as a tunable input optical coupler, in which the coupling ratio is controlled by the phase shifter $\phi_i$,i=1, ..., N. The upper outputs of all interferometers are combined into a single output, which feeds the optical delay line (17). The phase shifters $\beta_i$ are required to define and stabilize the relative phases of such optical combiner (16). The lower outputs of all interferometers are likewise combined into a single output, which feeds the lower input of the output 2-by-2 optical coupler (18). The phase shifters $\gamma_i$ are required to define and stabilize the relative phases of such optical combiner.

While in the first embodiment all TODLs are independent from one another, in this embodiment, by embedding the array of optical combiners (16) in the array of N TODLs, all TODLs now share the upper and lower arms of the MZDI-TCR, in which the optical delay line (17) is included in the upper arm. As previously referred, the advantage is that only a single optical delay line (17) is required. However, such advantage has the cost of requiring two sets of optical combiners (16), which therefore may require up to twice the number of monitoring points (13) in comparison with the first embodiment. An increased flexibility is achieved if the optical delay line (17) is tunable.

Figure 6:
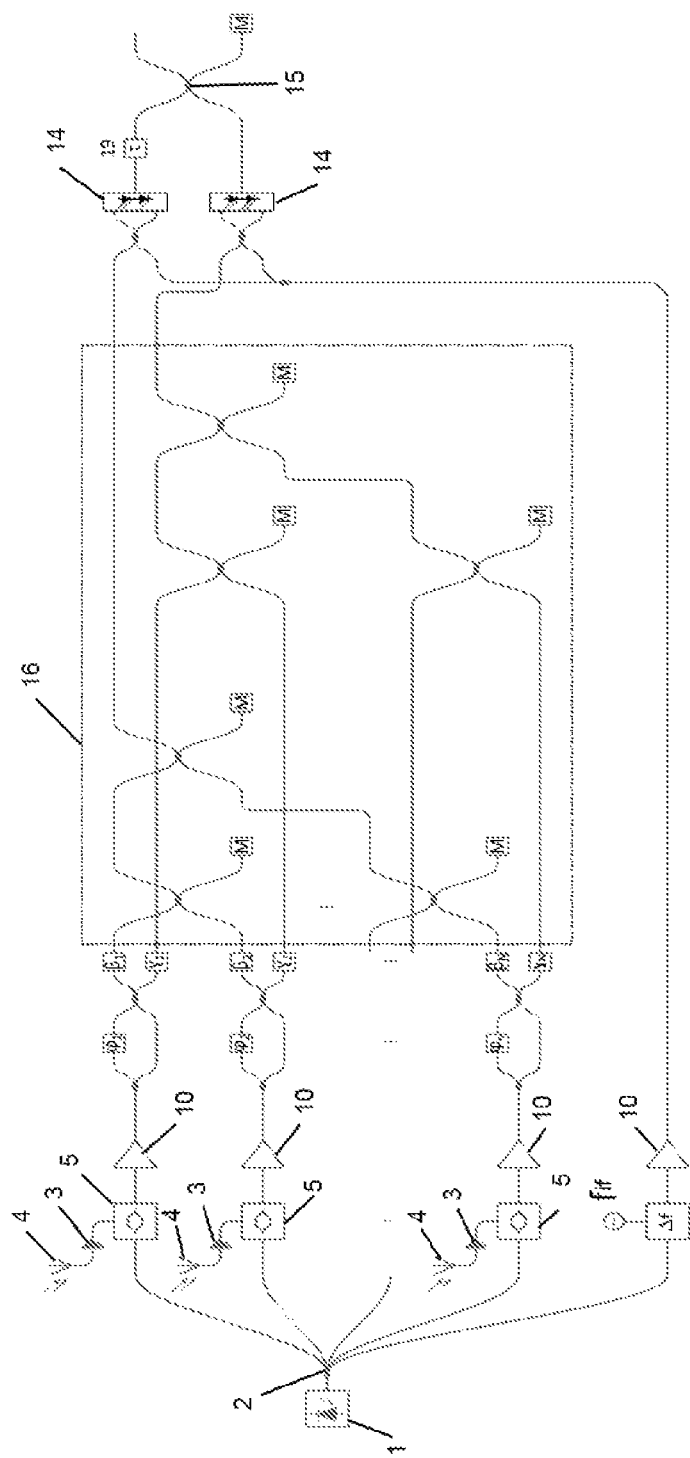
FIG. 6 shows a fifth embodiment, identical to the third one with the difference that a single electrical delay line (19) is used, i.e., the delay line is moved from the optical domain into the electrical domain. In order to achieve so two coherent receivers (14) are used, one for detecting the combined signals of the upper output of the input optical coupler with tunable coupling ratio of all MZDIs, and another for detecting the combined signals of the lower output of the input optical coupler with tunable coupling ratio of all MZDIs.

A fifth embodiment is shown in FIG. 6. This embodiment has similarities with the fourth embodiment, but here the system only has a single electrical delay line (19). In order to achieve so the upper outputs of all interferometers are combined into a single output, which is coherently detected by the upper coherent receiver (14). Likewise, the lower outputs of all interferometers are combined into a single output, which is coherently detected by the lower coherent receiver (14). The output electrical signal of the upper coherent receiver (14) is delayed by the electrical delay line (19) and then combined with the output electrical signal of the lower coherent receiver (14) into a final electrical output signal. An increased flexibility is achieved if the electrical delay line (19) is tunable.

Figure 2:
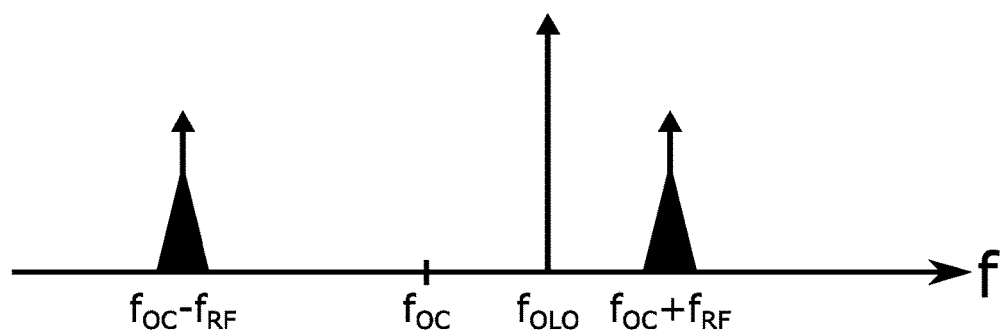
FIG. 2 illustrates the optical spectrum at the input of the coherent receiver (14), comprising both the output optical signal and the frequency-shifted optical local oscillator.
Figure 7:
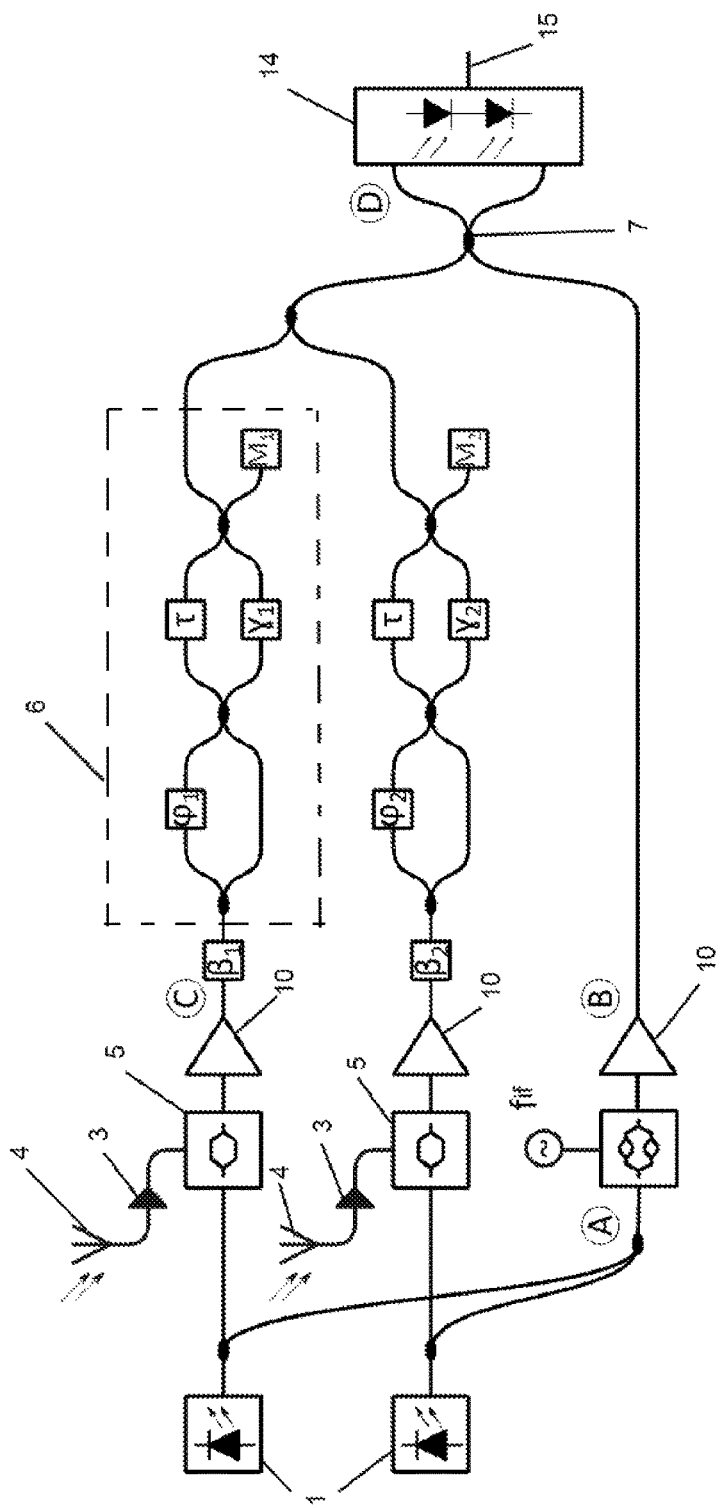
FIG. 7 shows a sixth embodiment, identical to the first one with the difference that two laser sources (1) are used. All laser sources (1) should have different wavelengths, and each laser source (1) feeds at least one electro-optic modulator (5). All laser signals are frequency-shifted at the bottom branch, therefore generating wavelength-division multiplexed frequency-shifted OLOs. Only one coherent receiver (14) is used for simultaneously detecting all wavelength-division multiplexed signals.
Figure 8:
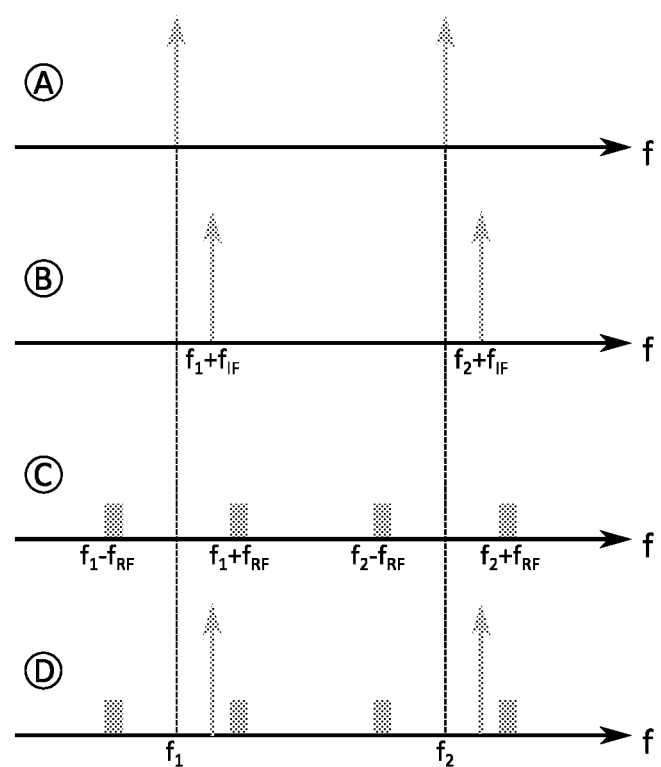
FIG. 8 shows optical spectra at different points of FIG. 7.

A sixth embodiment is shown in FIG. 7. In comparison with the first embodiment, this embodiment uses more than one laser source (1), such that all laser sources (1) have different wavelengths. Even though in FIG. 7 one laser source (1) is assigned to one electro-optic modulator, in practice one laser source (1) can be shared by various electro-optic modulators (5). The delayed optical signals are combined into a single wavelength-division multiplexed signal, with as many colors or channels as the number of laser sources. The generation of the frequency-shifted OLO is similar to the first embodiment, but now there as many frequency-shifted LOs as the number of laser sources. As coherent detection is theoretically transparent to the wavelength of the input signal, only one coherent receiver (14) is used, therefore adding all input optical signals. Hence signal combination into a final signal is also performed in coherent detection. As observed in FIG. 8, the optical spectra are very similar to the original optical spectrum shown in FIG. 2.

The main innovative features of the architecture of the present invention can be described as:

- SSB filtering enables frequency down-conversion during coherent detection. Therefore, the required bandwidth of the balanced receiver is relaxed from $\sim f_{RF}$ down to $\sim f_{RF}-f_{IF}$;
- besides the true-time delay functionality provided by the MZDIs, photonic RF phase shifting is achieved by manipulating the phase shifters $\beta_i$ (11). This is also made possible by SSB filtering;
- band-pass filtering at the end of the system allows not only filtering the desired RF signal centered at $f_{RF}-f_{IF}$, but it also mitigates harmonic distortion in data modulation, suppresses the RF tone (located at $f_{IF}$) generated due to having limited ER in the MZMs and/or IQ modulators, and suppresses the tones (at DC and $2f_{RF}$) generated due to imbalance of the balanced photodiodes;
- using the same laser source (1) for data modulation and local oscillator results in phase noise cancellation, which enables using simpler laser structures with a potential higher power;
- the system can handle different RF frequencies, not only because the MZDIs need only to delay one sideband, but also because $f_{IF}$ can be varied using a tunable RF local oscillator;
- theoretically lossless power combination from different beamforming systems can be achieved by controlling the phase of the received RF signals and using RF hybrid couplers;
- monitoring the system at strategic points enables robust operation against fabrication faults, thermal and mechanical instabilities, and laser frequency drifts.

As is clear to the person skilled in the art when considering the present disclosure, this invention is not strictly limited to the described embodiments, for several possible configurations are yet within the scope of this invention.

The above disclosed embodiments may be combinable, in the several possible configurations, being the repetition of all the possible combinations avoided.

The invention claimed is:

1. A photonic beamforming system for a phased array antenna with N antenna elements (4) which comprises:
    means for generating a first and a second optical carrier, wherein the first and second optical carriers have different frequencies;
    means for optically processing N signals from N antenna elements, which comprise:
        an array of N electro-optic modulators (5), each having as input a copy of the first optical carrier and being driven by the RF signal generated by one of the N antenna elements;
        an array of N tunable optical delay lines (TODL) (6), each having as input the output signal of one of the N electro-optic modulators (5), wherein each TODL (6) has a periodic frequency response;
        an array of optical combiners (7) having as input the output signals of the array of N TODL, and producing at least one output signal;
    means for converting at least one output signal from said means for optically processing the N signals from the N antenna elements (4) to an electrical output signal, which comprise:
        an array of coherent receivers (14), each having as a first input one of the output signals of the array of optical combiners (7), and, as a second input a copy of the second optical carrier, which serves as an optical local oscillator (OLO);
        an array of electrical combiners (15) having as input the output signals of the array of coherent receivers (14), and producing at least one output signal which is the electrical output signal of the photonic beamforming system.

2. A photonic beamforming system according to claim 1 wherein each TODL (6) with a periodic frequency response is a Mach-Zehnder delay interferometer with tunable coupling ratio (MZDI-TCR).

3. A photonic beamforming system according to claim 2 wherein the array of optical combiners (7) is embedded in the array of N TODL, in which:
    each MZDI-TCR comprises an input optical coupler with tunable coupling ratio having a first and a second output;
    the array of optical combiners (7) comprises three sets of optical combiners, such that:
        the first set of optical combiners (16) is arranged such that it combines the signals from the first output of the N input optical couplers with tunable coupling ratio;
        the second set of optical combiners (16) is arranged such that it combines the signals from second output of the N input optical couplers with tunable coupling ratio;
        at least one output of the first set of optical combiners (16) is connected to an optical delay line (17);
        the third set of optical combiners (18) is arranged such that it combines at least one output signal from the second set of optical combiners (16) with the output signals from the optical delay lines (17).

4. A photonic beamforming system for a phased array antenna with N antenna elements (4) according to claim 3 also comprising an array of phase shifters, wherein one phase shifter is connected to each output of the input optical couplers with tunable coupling ratio of each MZDI-TCR.

5. A photonic beamforming system according to claim 2 wherein the array of optical combiners, the array of coherent receivers (14) and the array of electrical combiners (15) are embedded in the array of N TODL, in which:
    each MZDI-TCR comprises an input optical coupler with tunable coupling ratio having a first and a second outputs;
    the array of optical combiners (7) comprises two sets of optical combiners, such that:
        the first set of optical combiners (16) is arranged such that it combines the signals from the first output of the N input optical couplers with tunable coupling ratio;
        the second set of optical combiners (16) is arranged such that it combines the signals from second output of the N input optical couplers with tunable coupling ratio;
    the array of coherent receivers (14) comprises two sets of coherent receivers (14) such that:
        each coherent receiver (14) of the first set of coherent receivers (14) has as a first input one the output signals of the first set of optical combiners (16) and, as a second input a copy of the second optical carrier, which serves as an OLO;
        each coherent receiver (14) of the second set of coherent receivers (14) has as a first input one the output signals of the second set of optical combiners (16) and, as a second input a copy of the second optical carrier, which serves as an OLO;
    the array of electrical combiners (15) comprises three sets of electrical combiners (15), such that:
        the first set of electrical combiners (15) is arranged such that it combines the signals from the first set of coherent receivers (14);
        the second set of electrical combiners (15) is arranged such that it combines the signals from the second set of coherent receivers (14);
        at least one output of the first set of electrical combiners (15) is connected to an electrical delay line (19);
        the third set of electrical combiners (15) is arranged such that it combines at least one output signal from the second set of electrical combiners (15) with the output signals from the electrical delay lines (19).

6. A photonic beamforming system according to claim 2 wherein each MZDI-TCR has at least two outputs, wherein at least one output is a monitoring point (13).

7. A photonic beamforming system according to claim 1 wherein each TODL (6) with a periodic frequency response is a ring resonator with a tunable coupling ratio.

8. A photonic beamforming system according to claim 1 wherein the second optical carrier is generated from the first optical carrier.

9. A photonic beamforming system according to claim 1 wherein it further comprises:
    an optical splitter (2) connected to the means for generating a first and a second optical carrier, for generating N copies of the first optical carrier.

10. A photonic beamforming system for a phased array antenna with N antenna elements (4) according to claim 1 also comprising an array of optical amplifiers (10), wherein each optical amplifier is connected to the output of one of the N electro-optic modulators (5).

11. A photonic beamforming system for a phased array antenna with N antenna elements (4) according to claim 1 also comprising an array of phase shifters (11), wherein each phase shifter (11) is connected to the output of one of the N electro-optic modulators (5).

12. A photonic beamforming system according to claim 1 wherein at least one output of the array of optical combiners (7) and of the array of electrical combiners (15) is a monitoring point (13).

13. A photonic beamforming system according to claim 1 also comprising a monitoring and control system, wherein such system reads information from the monitoring points (13) or from the electrical and optical outputs of the photonic beamforming system, processes the information in a digital signal processor, and actuates on the array of N electro-optic modulators (5), on the array of optical amplifiers (10), and on the array of phase shifters (11).

14. Method for beamforming the radio signal received by a phased array antenna with N antenna elements, implemented by a photonic beamforming system for a phased array antenna with N antenna elements (4) which comprises:
  means for generating a first and a second optical carrier, wherein the first and second optical carriers have different frequencies;
  means for optically processing N signals from N antenna elements, which comprise:
    an array of N electro-optic modulators (5), each having as input a copy of the first optical carrier and being driven by the RF signal generated by one of the N antenna elements;
    an array of N tunable optical delay lines (TODL) (6), each having as input the output signal of one of the N electro-optic modulators (5), wherein each TODL (6) has a periodic frequency response;
    an array of optical combiners (7) having as input the output signals of the array of N TODL, and producing at least one output signal;
  means for converting at least one output signal from said means for optically processing the N signals from the N antenna elements (4) to an electrical output signal, which comprise:
    an array of coherent receivers (14), each having as a first input one of the output signals of the array of optical combiners (7), and, as a second input a copy of the second optical carrier, which serves as an optical local oscillator (OLO);
  an array of electrical combiners (15) having as input the output signals of the array of coherent receivers (14), and producing at least one output signal which is the electrical output signal of the photonic beamforming system,
said method comprising the following steps:
generation of a first and a second optical carriers;
inputting N copies of the first optical carrier in means for optically processing N signals from N antenna elements, specifically in each electro-optic modulator of an array of electro-optic modulators comprised by said means;
modulation of each copy of the first optical carrier with an RF signal generated by one of the N antenna elements;
processing of each resulting signal in one of N TODL;
optical combination of the processed signals into at least one output optical signal;
converting said at least one output optical signal to an electrical output signal, which comprises:
  heterodyne coherent detection of each resulting signal in an array of coherent receivers, using a copy of the second optical carrier as OLO;
  combination of the resulting signals into at least one electrical output signal, one of which is the electrical output signal of the photonic beamforming system.

15. Method for beamforming the radio signal received by a phased array antenna with N antenna elements (4) according to claim 14, wherein each TODL (6) of said photonic beamforming system has a periodic frequency response is a Mach-Zehnder delay interferometer with tunable coupling ratio (MZDI-TCR) and the array of optical combiners (7) is embedded in the array of N TODL, in which:
  each MZDI-TCR comprises an input optical coupler with tunable coupling ratio having a first and a second output;
  the array of optical combiners (7) comprises three sets of optical combiners, such that:
    the first set of optical combiners (16) is arranged such that it combines the signals from the first output of the N input optical couplers with tunable coupling ratio;
    the second set of optical combiners (16) is arranged such that it combines the signals from second output of the N input optical couplers with tunable coupling ratio;
    at least one output of the first set of optical combiners (16) is connected to an optical delay line (17);
    the third set of optical combiners (18) is arranged such that it combines at least one output signal from the second set of optical combiners (16) with the output signals from the optical delay lines (17),
  the method further comprising the following steps:
    splitting each of the signals resulting from electro-optic modulation into a first signal and a second signal, wherein both signals may have different amplitudes;
    optical combination of the resulting first signals into at least one first combined optical signal;
    optical combination of the resulting second signals into at least one second combined optical signal;
    delay of at least one first combined output signal;
    optical combination of the resulting signals with at least one second combined output signal into at least one output optical signal.

16. Method for beamforming the radio signal received by a phased array antenna with N antenna elements (4) according to claim 14, wherein the array of optical combiners, the array of coherent receivers (14) and the array of electrical combiners (15) of said system are embedded in the array of N TODL, in which:
  each MZDI-TCR comprises an input optical coupler with tunable coupling ratio having a first and a second outputs;
  the array of optical combiners (7) comprises two sets of optical combiners, such that:
    the first set of optical combiners (16) is arranged such that it combines the signals from the first output of the N input optical couplers with tunable coupling ratio;
    the second set of optical combiners (16) is arranged such that it combines the signals from second output of the N input optical couplers with tunable coupling ratio;
  the array of coherent receivers (14) comprises two sets of coherent receivers (14) such that:
    each coherent receiver (14) of the first set of coherent receivers (14) has as a first input one the output signals of the first set of optical combiners (16) and, as a second input a copy of the second optical carrier, which serves as an OLO;

each coherent receiver (14) of the second set of coherent receivers (14) has as a first input one the output signals of the second set of optical combiners (16) and, as a second input a copy of the second optical carrier, which serves as an OLO;

the array of electrical combiners (15) comprises three sets of electrical combiners (15), such that:

the first set of electrical combiners (15) is arranged such that it combines the signals from the first set of coherent receivers (14);

the second set of electrical combiners (15) is arranged such that it combines the signals from the second set of coherent receivers (14);

at least one output of the first set of electrical combiners (15) is connected to an electrical delay line (19);

the third set of electrical combiners (15) is arranged such that it combines at least one output signal from the second set of electrical combiners (15) with the output signals from the electrical delay lines (19), said method further comprising the following steps:

splitting each of the signals resulting from electro-optic modulation into a first signal and a second signal, wherein both signals may have different amplitudes;

optical combination of the resulting first signals into at least one first combined optical signal;

optical combination of the resulting second signals into at least one second combined optical signal;

heterodyne coherent detection of at least one first combined optical signal, generating a first set of electrical signals;

heterodyne coherent detection of at least one second combined optical signal, generating a second set of electrical signals;

electrical combination of the first set of electrical signals into at least one first combined electrical signal;

electrical combination of the second set of electrical signals into at least one second combined electrical signal;

delay of at least one first combined electrical signal;

electrical combination of the resulting signals with at least one second combined electrical signal into at least one output electrical signal.

\* \* \* \* \*